(12) United States Patent
Kim (10) Patent No.: US 11,348,196 B2
(45) Date of Patent: May 31, 2022

(54) LOGISTICS CENTER AUTOMATION SYSTEM

(71) Applicant: ELECTRONICS AND TELECOMMUNICATIONS RESEARCH INSTITUTE, Daejeon (KR)

(72) Inventor: Ki Hak Kim, Sejong-si (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 351 days.

(21) Appl. No.: 16/594,360

(22) Filed: Oct. 7, 2019

(65) Prior Publication Data

US 2020/0242720 A1 Jul. 30, 2020

(30) Foreign Application Priority Data

Jan. 29, 2019 (KR) .................. KR10-2019-0011173

(51) Int. Cl.
*G06F 7/00* (2006.01)
*G06Q 50/28* (2012.01)
(Continued)

(52) U.S. Cl.
CPC ........... *G06Q 50/28* (2013.01); *B65G 1/1373* (2013.01); *B65G 47/1492* (2013.01);
(Continued)

(58) Field of Classification Search
CPC .... G06Q 50/28; G06Q 10/083; G06Q 10/087; B65G 1/1373; B65G 47/1492; B65G 67/04; B65G 47/681; B65G 47/71; B65G 2203/041; B65G 2203/044; B65G 43/08; B65G 43/10; B65G 47/28; B65G 67/08; B65G 2201/02; G05D 1/0027; G05D 1/0223; G05D 2201/0216; G05D 1/0297; G06T 7/50; G06T 2207/10028; B07C 5/36
(Continued)

(56) References Cited

U.S. PATENT DOCUMENTS 10,577,180 B1 * 3/2020 Mehta ...................... B25J 9/162
2012/0127202 A1 5/2012 Choi et al.
(Continued)

FOREIGN PATENT DOCUMENTS

KR 10-1830584 B1 2/2018

OTHER PUBLICATIONS

Dong-Hyuk Jeong et al., "Study on Design of Mobile Robot for Autonomous Freight Transportation", Journal of Korean Institute of Intelligent Systems, vol. 23, No. 3, pp. 202-207, Jun. 2013.

*Primary Examiner* — Yolanda R Cumbess
(74) *Attorney, Agent, or Firm* — LRK Patent Law Firm (57) ABSTRACT

A logistics center automation system includes a singulator to which a cluster control for simultaneously moving articles unloaded from a plurality of unloading vehicles is applied, a transport robot configured to deliver the articles moved by the singulator to a loading vehicle corresponding to destination information, a mobile multi-recognizer configured to extract destination information of the transport robot, and a controller configured to control the singulator, the transport robot, and the mobile multi-recognizer.

17 Claims, 4 Drawing Sheets

(51) Int. Cl.
*G05D 1/00* (2006.01)
*G05D 1/02* (2020.01)
*B65G 47/14* (2006.01)
*B65G 1/137* (2006.01)
*G06Q 10/08* (2012.01)
*B65G 67/04* (2006.01)
*G06T 7/50* (2017.01)

(52) U.S. Cl.
CPC ........... *B65G 67/04* (2013.01); *G05D 1/0027* (2013.01); *G05D 1/0223* (2013.01); *G06Q 10/083* (2013.01); *G06Q 10/087* (2013.01); *G06T 7/50* (2017.01); *G05D 2201/0216* (2013.01); *G06T 2207/10028* (2013.01)

(58) Field of Classification Search
USPC .................................. 700/213, 223–224, 230
See application file for complete search history.

(56) References Cited

U.S. PATENT DOCUMENTS

2018/0144429 A1 5/2018 Kim et al.
2018/0215552 A1 8/2018 Kim

\* cited by examiner

LOGISTICS CENTER AUTOMATION SYSTEM

CROSS-REFERENCE TO RELATED APPLICATION(S)

This application claims the priority benefit of Korean Patent Application No. 10-2019-0011173, filed on Jan. 29, 2019, in the Korean Intellectual Property Office, the disclosure of which is incorporated herein by reference for all purposes.

BACKGROUND

1. Field

One or more example embodiments relate to a logistics center automation system and, more particularly, to technology for optimizing operations of devices in the logistics center automation system based on a change in amount of articles inserted into a logistics center.

2. Description of Related Art

Due to the growth of the courier industry, the volume of courier services is increasing every year. As a result, there is a tendency to automate all of the work processes in the logistics center, and most logistics centers use an article classifier to automatically handle the delivery volume.

Since such an article classifier classifies articles at a high speed, it is difficult to keep up with the speed of the article classifier when a person loads the article. Accordingly, in Europe, a device for automatically feeding articles is introduced and used in order to reduce the workload of the operator and improve the processing speed. Jingdong logistics center in China developed and commercialized a system that automatically classifies articles while simultaneously operating several mobile robots. Toshiba in Japan has been developing a system that automatically loads articles from a classifier into a pallet.

However, until now, there have been no cases in which the entire work process (getting in/out-sorting/transfer/loading/loading) in the logistics center is automated. In terms of mobile robots of the Jingdong logistics center in China, which has the most automation, the throughput per hour is less than the typical classifier because a person operates the mobile robot to recognize the barcodes of the articles and load the articles in the robot.

SUMMARY

An aspect provides a logistics center automation system and, more particularly, a system for optimizing operations of devices in the logistics center automation system based on a change in amount of articles inserted into a logistics center According to an aspect, there is provided a logistics center automation system including a singulator to which a cluster control for simultaneously moving articles unloaded from a plurality of unloading vehicles is applied, a transport robot configured to deliver the articles moved by the singulator to a loading vehicle corresponding to destination information, a mobile multi-recognizer configured to extract destination information of the transport robot, and a controller configured to control the singulator, the transport robot, and the mobile multi-recognizer.

The controller may be configured to adjust a number of simultaneously movable columns of the singulator based on a change in amount of the articles unloaded from the plurality of unloading vehicles.

The controller may be configured to adjust a space between the articles moving toward a rear end of the singulator based on the number of simultaneously movable columns.

The controller may be configured to adjust a number of simultaneously operable transport robots based on a change in amount of the articles unloaded from the plurality of unloading vehicles.

The controller may be configured to control the transport robot to be on standby in at least two columns at a position to receive an article from the singulator.

When an article is received from the singulator, the transport robot may be configured to move to a loading vehicle corresponding to the destination information extracted using the mobile multi-recognizer, based on autonomous driving.

When a route of the autonomous driving overlaps a route of another transport robot, the transport robot may be configured to move to the loading vehicle corresponding to the destination information without stopping based on an accelerating and decelerating algorithm.

When the articles are delivered to a loading vehicle corresponding to destination information, the transport robot may be configured to move to a standby area to perform charging and move to a position at which an article is received from the singulator based on a cluster movement under a control of the controller.

The controller may be configured to adjust a number of simultaneously operable mobile multi-recognizers based on a change in amount of the articles unloaded from the plurality of unloading vehicles.

When charging is required, the mobile multi-recognizer may be configured to automatically move to a charging area.

The logistics center automation system may further include an automatic loader configured to load the articles delivered by the transport robot into the loading vehicle.

The automatic loader may include a conveyor belt to load the delivered articles into the loading vehicle.

The automatic loader may be configured to load the delivered articles into the loading vehicle by recognizing a space in the loading vehicle using a three-dimensional (3D) depth camera and vertically moving the conveyor belt based on the recognized space.

According to another aspect, there is provided a logistics center automation system including an automatic unloader configured to unload articles from a plurality of unloading vehicles, a singulator to which a cluster control for simultaneously moving the articles unloaded by the automatic unloader is applied, a transport robot configured to deliver the articles moved by the singulator to a loading vehicle corresponding to destination information, a mobile multi-recognizer configured to extract destination information of the transport robot, and an automatic loader configured to load the articles delivered by the transport robot into the loading vehicle.

A number of simultaneously movable columns of the singulator may be adjusted based on a change in amount of the articles unloaded from the plurality of unloading vehicles.

A number of simultaneously operable transport robots may be adjusted based on a change in amount of the articles unloaded from the plurality of unloading vehicles.

A number of simultaneously operable mobile multi-recognizers may be adjusted based on a change in amount of the articles unloaded from the plurality of unloading vehicles.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Figure 1:
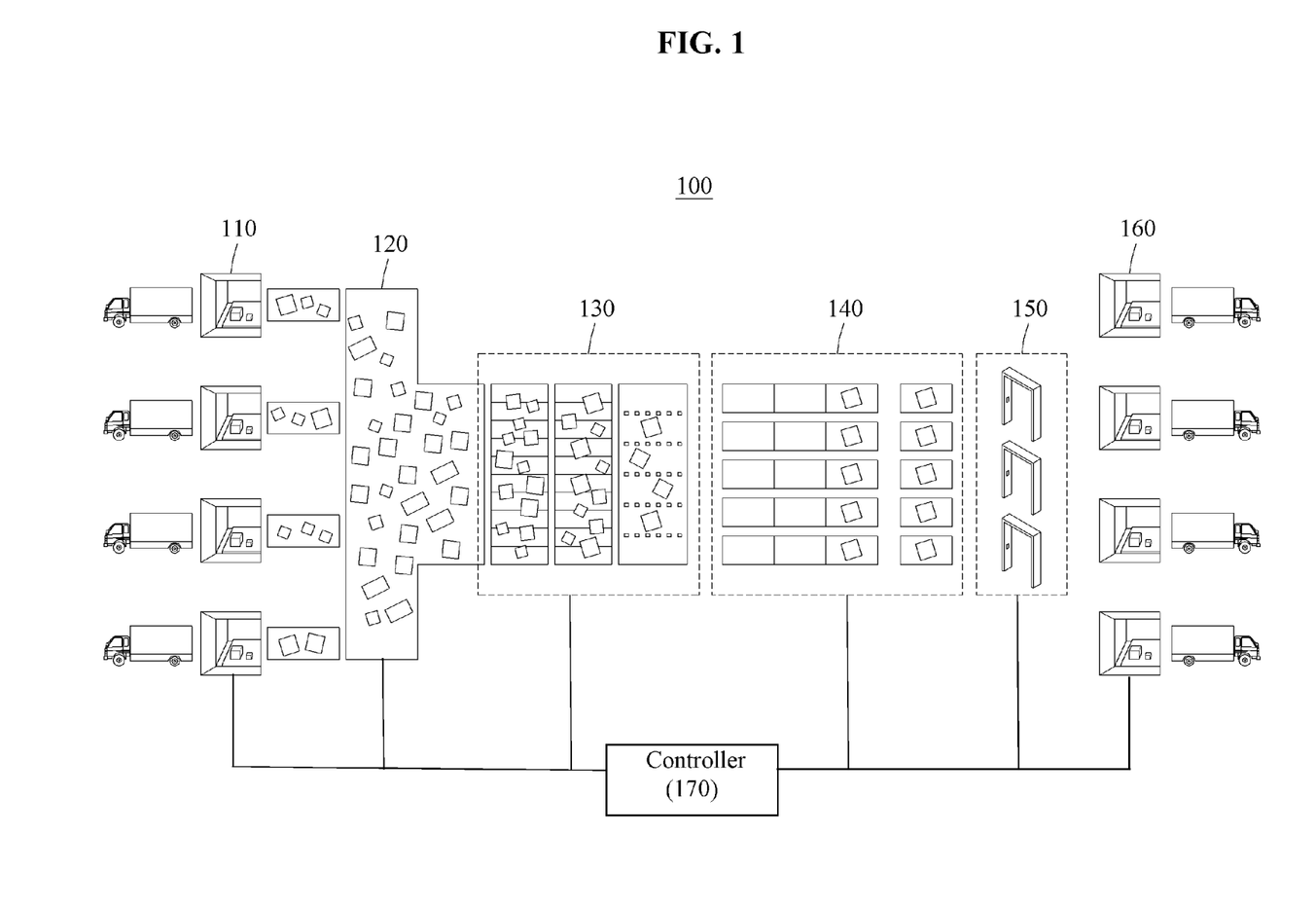
FIG. 1 is a diagram illustrating a logistics center automation system according to an example embodiment.

FIG. 1 is a diagram illustrating a logistics center automation system according to an example embodiment.

A logistics center automation system 100 may include an automatic unloader 110, a merge conveyor 120, a singulator 130, a transport robot 140, a mobile multi-recognizer 150, an automatic loader 160, and a controller 170 that operates in conjunction with the automatic unloader 110, the merge conveyor 120, the singulator 130, the transport robot 140, the mobile multi-recognizer 150, and the automatic loader 160 to control operations thereof.

The automatic unloader 110 may automatically unload articles from a plurality of unloading vehicle to the merge conveyor 120. In this instance, the automatic unloader 110 may transmit quantity information of the articles in an unloading vehicle managed by the automatic unloader 110 to the controller 170. The controller 170 may adjust an operation speed of the automatic unloader 110 based on the quantity information. That is, the controller 170 may control the operation speed of the automatic unloader 110 based on an acceptable quantity of the merge conveyor 120 using quantity information of each of the unloading vehicles received from all the automatic unloaders 110 in the logistics center.

For example, when the quantity information of each of the unloading vehicles received from all the automatic unloaders 110 in the logistics center excesses the acceptable quantity of the merge conveyor 120, the controller 170 may reduce the operation speed of the automatic unloader 110 to optimize an operation of the merge conveyor 120.

The merge conveyor 120 may aggregate the articles unloaded from the plurality of unloading vehicles and transmit the articles to the singulator 130. In this instance, the operation speed of the merge conveyor 120 may be adjusted based on a change in amount of the articles inserted by the automatic unloader 110.

For example, the controller 170 may control the merge conveyor 120 to increase the operation speed as the amount of the articles inserted by the automatic unloader 110 increases, and control the merge conveyor 120 to reduce the operation speed as the amount of the articles inserted by the automatic unloader 110 decreases.

The singulator 130 may cluster the articles inserted through the merge conveyor 120 in at least one column and move the clustered articles in a transport direction. In this instance, a number of simultaneously movable columns of the singulator 130 may be adjusted based on the change in amount of the articles unloaded from all the unloading vehicles in the logistics center.

The transport robot 140 may mount the articles moved by the singulator 130 and transmit the mounted articles to a sending gate corresponding to an identified destination by passing through the mobile multi-recognizer 150. When the destination is identified, the transport robot 140 may move by automatically generating an optimal route. In this example, the transport robot 140 may be on standby at a position in at least two columns to receive the articles from the singulator 130. When the articles are received, a conveyor belt may be installed on the top such that the articles are mounted from a rightmost column.

A number of simultaneously operable transport robots 140 may be adjusted based on a change in amount of the articles unloaded from the unloading vehicles. For example, the controller 170 may control more transport robots 140 to participate in transporting the articles as the amount of the articles unloaded from the unloading vehicles increases, and control less transport robots 140 to participate in transporting the articles as the amount of the articles unloaded from the unloading vehicles decreases.

The automatic loader 160 may be installed at the sending gate to automatically load the articles transported by the transport robot 140 into a loading vehicle. In this instance, a conveyor belt may be installed on the automatic loader 160 to load the transported articles into the loading vehicle. Also, the automatic loader 160 may recognize an inner space of the loading vehicle using a three-dimensional (3D) depth camera and optimize the loading by vertically moving the conveyor belt based on the recognized space.

Figure 2:
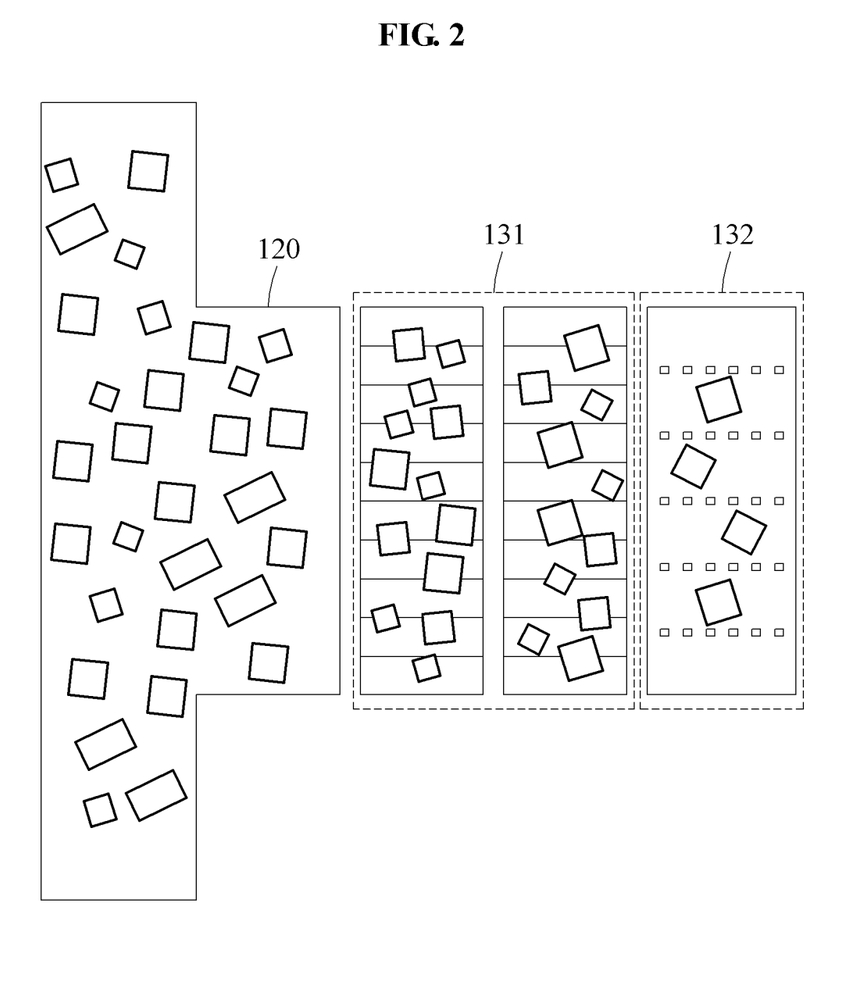
FIG. 2 is a diagram illustrating a singulator to which a cluster control is applied according to an example embodiment.

FIG. 2 is a diagram illustrating a singulator to which a cluster control is applied according to an example embodiment.

The singulator 130 may cluster articles inserted through the merge conveyor 120 in at least one column and move the clustered articles. In this instance, a number of simultaneously movable columns of the singulator 130 may be adjusted based on a change in amount of the articles unloaded from all unloading vehicles in a logistics center. That is, a cluster column variable may be automatically assigned based on an amount of the articles unloaded from the unloading vehicles, so that the singulator 130 simultaneously moves several columns of articles.

For example, the controller 170 may control the singulator 130 to move more articles simultaneously by setting a high cluster column variable as the amount of articles unloaded from the unloading vehicles increases. In contrast, the controller 170 may control the singulator 130 to move less articles simultaneously by setting a low cluster column variable as the amount of articles unloaded from the unloading vehicles decreases.

The singulator 130 may include a front end portion 131 and a rear end portion 132. As described above, the front end portion 131 of the singulator 130 may be adjustable in a number of simultaneously movable columns based on the change in amount of articles unloaded from the unloading vehicles, so that the singulator 130 simultaneously moves several columns of articles.

Also, the singulator 130 may adjust an interval between articles moving through the rear end portion 132 based on the number of simultaneously movable columns, thereby delivering the articles to the transport robot 140. For example, the controller 170 may reduce the interval between the articles moving through the rear end portion 132 as the number of simultaneously movable columns increases, and may increase the interval between the articles moving through the rear end portion 132 as the number of simultaneously movable columns decreases.

Figure 3:
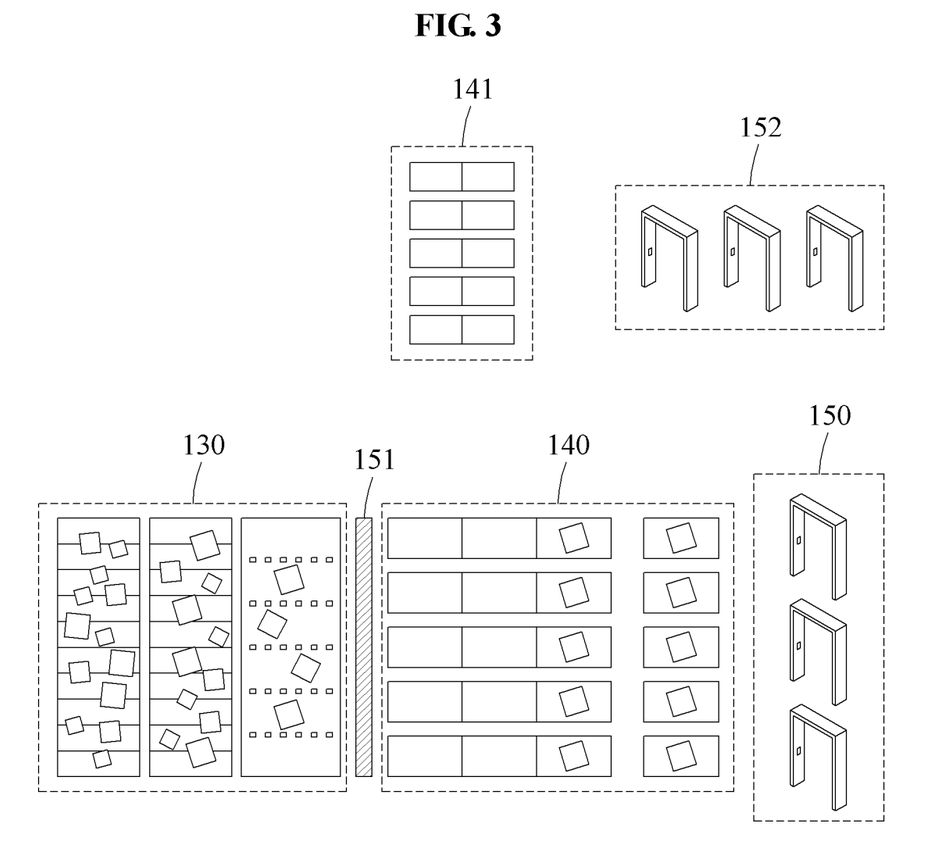
FIG. 3 is a diagram illustrating a transport robot and a recognizer performing a cluster movement according to an example embodiment.

FIG. 3 is a diagram illustrating a transport robot and a recognizer performing a cluster movement according to an example embodiment.

Several columns of articles moved through the singulator 130 may be mounted on the transport robots 140 that may perform cluster movement. In this example, a bottom-face recognizer 151 may be installed below a gap between the singulator 130 and the transport robot 140. For example, the bottom-face recognizer 151 may be a barcode-based recognizer. That is, the bottom-face recognizer 151 may recognize a barcode on a bottom face of an article, thereby acquiring article information including an address of a destination of the article.

The transport robot 140 carrying the article of which the article information has been acquired by the bottom-face recognizer 151 may deliver the article to a sending gate corresponding to the destination without separate recognition process in the mobile multi-recognizer 150.

When the article information is on a face other than the bottom face, the transport robot 140 may acquire the article information of the article using the mobile multi-recognizer 150. Specifically, the transport robot 140 carrying the article may pass the mobile multi-recognizer 150. While passing, the transport robot 140 may recognize a barcode on a face exposed outside using the mobile multi-recognizer 150, thereby acquiring the article information including an address of a destination of the article.

The transport robot 140 having acquired the article information may deliver the article to the automatic loader 160 installed at a sending gate corresponding to the address of the destination. The operable number of the transport robots 140 and the mobile multi-recognizers 150 may be automatically optimized and adjusted from the controller 170. A time unit of optimization may be in hours/minutes, or the optimization may be performed in units of day or month.

When the articles are simultaneously mounted on the transport robot 140 capable of performing the cluster movement, a plurality of transport robots 140 may be clustered and deliver the articles to the mobile multi-recognizer 150 simultaneously, so that the article information including the address of the destination is recognized through the barcode at the same time.

The transport robot 140 may travel straight ahead at a high speed to a position at which the mobile multi-recognizer 150 is located. After the article information is acquired through the barcode, the transport robot 140 may move based on autonomous driving by setting an optimal route corresponding to the address of the destination. When the article is delivered, the transport robot 140 may perform charging at a standby area 141 and prepare for loading and delivering articles under a control of the controller 170. Likewise, the mobile multi-recognizer 150 may operate using a battery. The mobile multi-recognizer 150 which is not in operation may be on standby or perform charging at a standby area 152. For this, the transport robot 140 and the mobile multi-recognizer 150 may share a current position and an ID with the controller 170.

Figure 4:
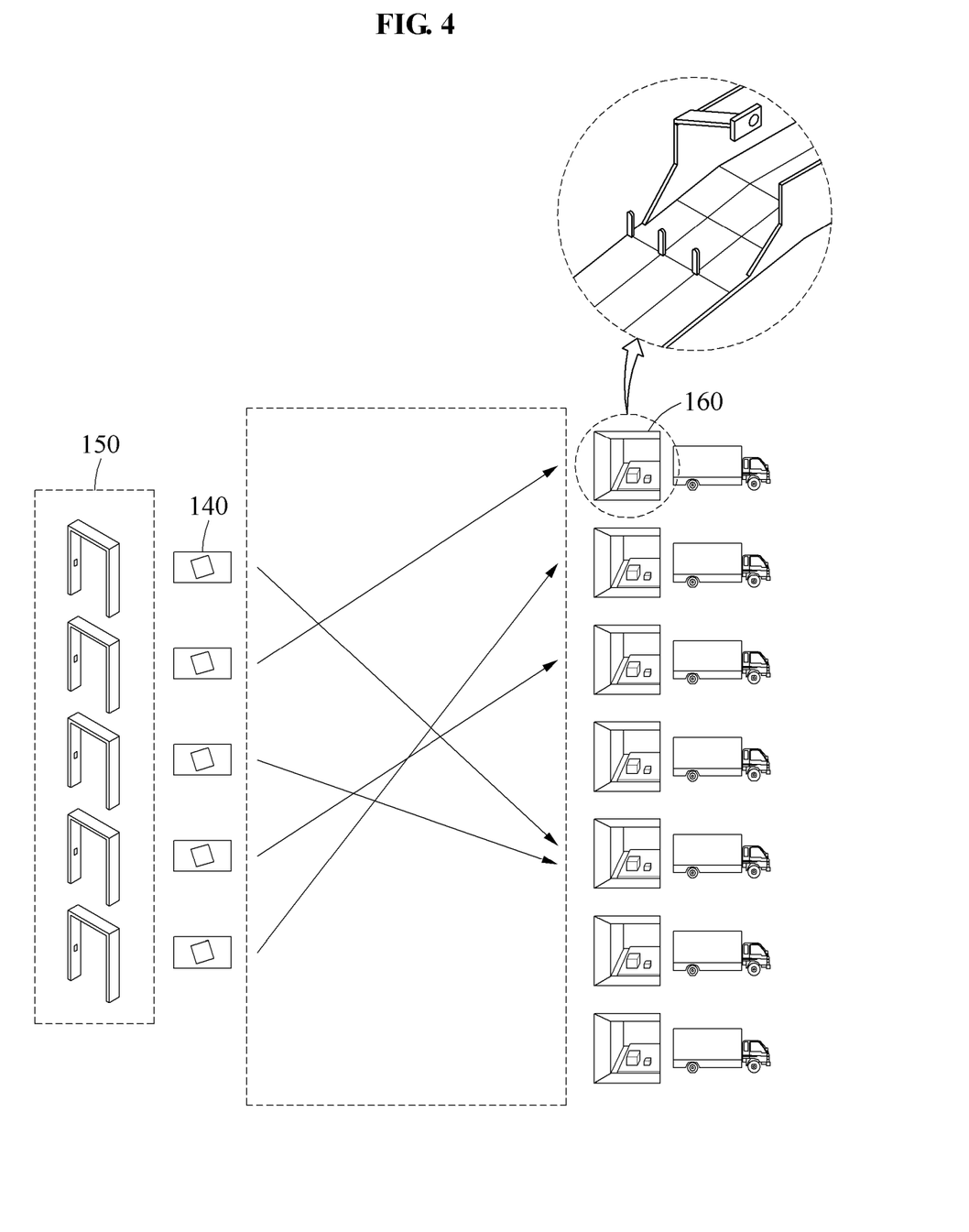
FIG. 4 is a diagram illustrating a movement of a transport robot and an automatic loader/unloader according to an example embodiment.

FIG. 4 is a diagram illustrating a movement of a transport robot and an automatic loader/unloader according to an example embodiment.

As described above, the transport robot 140 may acquire article information including destination information using the mobile multi-recognizer 150, obtain an optimum and minimum distance, and move to the automatic loader 160 based on autonomous driving.

When a route of the autonomous driving overlaps a route of another transport robot, the transport robot 140 move to the loading vehicle corresponding to the destination information without stopping based on an accelerating and decelerating algorithm, thereby optimizing a throughput per hour.

The automatic loader 160 may be installed at a sending gate and automatically load the articles delivered by the transport robot 140 into a loading vehicle. In this instance, a conveyor belt may be installed on the automatic loader 160 to load the transported articles into the loading vehicle. Also, the automatic loader 160 may recognize an inner space of the loading vehicle using a 3D depth camera and optimize the loading by vertically moving the conveyor belt based on the recognized space.

According to example embodiments, it is possible to provide a logistics center automation system that may optimize an operation of each device in the logistics center automation system based on a change in amount of articles entering a logistics center.

According to example embodiments, it is possible to optimize a throughput per hour by applying a cluster control-based singulator, a cluster-driving transport robot, and a multi-recognizer to a logistics center automation system.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A logistics center automation system comprising:
   a singulator which clusters simultaneously moving articles that have been unloaded from a plurality of unloading vehicles, the singulator clustering the articles in a controlled manner;
   a plurality of transport robots configured to deliver the articles moved by the singulator to a plurality of loading vehicles corresponding to destination information of the articles;
   a plurality of mobile multi-recognizers configured to extract the destination information of the articles from the articles; and
   a controller configured to control the singulator, the plurality of transport robots, and the plurality of mobile multi-recognizers.

2. The logistics center automation system of claim 1, wherein the controller is configured to adjust a number of simultaneously movable columns of the singulator based on a change in amount of the articles unloaded from the plurality of unloading vehicles.

3. The logistics center automation system of claim 2, wherein the controller is configured to adjust a space between the articles moving toward a rear end of the singulator based on the number of simultaneously movable columns.

4. The logistics center automation system of claim 1, wherein the controller is configured to adjust a number of simultaneously operable transport robots among the plurality of transport robots, based on a change in amount of the articles unloaded from the plurality of unloading vehicles.

5. The logistics center automation system of claim 1, wherein the controller is configured to control the plurality of transport robots to be on standby in at least two columns at positions to receive the articles from the singulator.

6. The logistics center automation system of claim 1, wherein when the articles are received from the singulator, the plurality of transport robots are configured to move to the plurality of loading vehicles corresponding to the destination information extracted using the plurality of mobile multi-recognizers, via autonomous driving.

7. The logistics center automation system of claim 6, wherein when a route of the autonomous driving of one of the transport robots overlaps a route of another of the transport robots, the one transport robot is configured to move to one of the loading vehicles corresponding to the destination information without stopping based on an accelerating and decelerating algorithm.

8. The logistics center automation system of claim 1, wherein upon completion of delivering the articles to the plurality of loading vehicles corresponding to the destination information, the plurality of transport robots are configured to move to a standby area to perform charging and move to positions at which the articles are received from the singulator based on a cluster movement under control of the controller.

9. The logistics center automation system of claim 1, wherein the controller is configured to adjust a number of simultaneously operable mobile multi-recognizers among the plurality of mobile multi-recognizers, based on a change in amount of the articles unloaded from the plurality of unloading vehicles.

10. The logistics center automation system of claim 1, wherein when charging is required, the plurality of mobile multi-recognizers are configured to automatically move to a charging area.

11. The logistics center automation system of claim 1, further comprising:
automatic loaders configured to load the articles delivered by the plurality of transport robots into the plurality of loading vehicles.

12. The logistics center automation system of claim 11, wherein the automatic loaders comprises conveyor belts to load the delivered articles into the plurality of loading vehicles.

13. The logistics center automation system of claim 12, wherein each of the automatic loaders is configured to recognize a space in each of the loading vehicles using a three-dimensional (3D) depth camera and vertically move each of the conveyor belts based on the recognized space to thereby load the delivered articles into the loading vehicles.

14. A logistics center automation system comprising:
a plurality of automatic unloaders configured to unload articles from a plurality of unloading vehicles;
a singulator which clusters simultaneously moving the articles that have been unloaded by the plurality of automatic unloaders, the singulator clustering the articles in a controlled manner;
a plurality of transport robots configured to deliver the articles moved by the singulator to a plurality of loading vehicles corresponding to destination information of the articles;
a plurality of mobile multi-recognizers configured to extract the destination information of the articles from the articles; and
a plurality of automatic loaders configured to load the articles delivered by the plurality of transport robots into the plurality of loading vehicles.

15. The logistics center automation system of claim 14, wherein a number of simultaneously movable columns of the singulator is adjusted based on a change in amount of the articles unloaded from the plurality of unloading vehicles.

16. The logistics center automation system of claim 14, wherein a number of simultaneously operable transport robots among the plurality of transport robots is adjusted based on a change in amount of the articles unloaded from the plurality of unloading vehicles.

17. The logistics center automation system of claim 14, wherein a number of simultaneously operable mobile multi-recognizers among the plurality of mobile multi-recognizers is adjusted based on a change in amount of the articles unloaded from the plurality of unloading vehicles.

* * * * *